US007382720B2

United States Patent
Arakawa

(10) Patent No.: US 7,382,720 B2
(45) Date of Patent: Jun. 3, 2008

(54) ACTIVE/STANDBY SWITCHING SYSTEM AND ACTIVE/STANDBY SWITCHING METHOD

(75) Inventor: Koji Arakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1091 days.

(21) Appl. No.: 10/608,624

(22) Filed: Jun. 27, 2003

(65) Prior Publication Data
US 2004/0008620 A1    Jan. 15, 2004

(30) Foreign Application Priority Data
Jun. 28, 2002    (JP)    ............... 2002-190673

(51) Int. Cl.
*G06F 7/00*    (2006.01)

(52) U.S. Cl. ............... 370/217; 370/216; 370/219; 370/395.1; 370/395.3

(58) Field of Classification Search ............... None
See application file for complete search history.

(56) References Cited

U.S. PATENT DOCUMENTS

| | | | |
|---|---|---|---|
| 6,327,243 B1* | 12/2001 | Gregorat | 370/218 |
| 6,418,144 B1 | 7/2002 | Saeki | |
| 6,529,473 B1* | 3/2003 | Bavant et al. | 370/217 |
| 6,747,974 B1* | 6/2004 | Hayashi | 370/395.1 |
| 2001/0055273 A1* | 12/2001 | Owada | 370/219 |

FOREIGN PATENT DOCUMENTS

| | | |
|---|---|---|
| JP | 11-298495 | 10/1999 |
| JP | 2002-026934 | 1/2002 |
| JP | 2002-044090 | 2/2002 |

* cited by examiner

*Primary Examiner*—Huy D. Vu
*Assistant Examiner*—Salvador E. Rivas
(74) *Attorney, Agent, or Firm*—Katten Muchin Rosenman LLP

(57) ABSTRACT

An active/standby switching system includes two AAL2 (ATM Adaptation Layer Type 2) cell assembling/disassembling processor units (20, 30) as an active system and a standby system so that active/standby switching is carried out between the active system and the standby system. The active/standby switching is carried out by transferring, from one of the AAL2 cell assembling/disassembling processor units (20) which has been the active system to the other AAL2 cell assembling/disassembling processor unit (30) which has been the standby system, handover information to prevent cell loss of AAL2 cells from occurring as a result of the active/standby switching and uncompleted cell data in the course of disassembling, the AAL2 cell assembling/disassembling processor unit (30) to become a new active system receiving the handover information and the uncompleted cell data and carrying out AAL2 cell assembling or disassembling.

7 Claims, 13 Drawing Sheets

ACTIVE/STANDBY SWITCHING SYSTEM AND ACTIVE/STANDBY SWITCHING METHOD

This application claims priority to prior application JP 2002-190673, the disclosure of which is incorporated herein by reference.

BACKGROUND OF THE INVENTION

This invention relates to an active/standby switching system and an active/standby switching method which are capable of preventing occurrence of cell loss at an AAL2 (ATM Adaptation Layer Type 2) layer.

An AAL2 cell assembling/disassembling processor is used In an ATM exchange or a system for carrying out application processing using an ATM cell. The AAL cell assembling/disassembling processor comprises a single processor unit which actually carries out processing. There is no AAL2 cell assembling/disassembling processor having a dual-system structure including two processor units as an active system and a standby system. As the degree of multiplexing is increased and a processing band is broadened, the processing ability of the single processor unit is greatly improved. However, because the AAL2 cell assembling/disassembling processor has such a single-system structure, an influence upon occurrence of system down of the single processor unit becomes more and more serious. In view of the above, there is an urgent demand to achieve an AAL2 cell assembling/disassembling processor having a dual-system structure.

As a first conventional technique similar in technical field to this invention, a "switching device" is disclosed in Japanese Unexamined Patent Publication No. 2002-44090 (JP 2002-44090 A). Th first conventional technique is an invention related to the switching device for switching an active route and a standby route for transmission of an ATM (Asynchronous Transfer Mode) cell between a transmitting unit and a receiving unit. The transmitting unit of the switching device includes ready signal generating means for generating a switching ready signal for requesting switching between the active route and the standby route, packet assembling means which is supplied with upper layer variable-length data to be transmitted and received between the transmitting unit and the receiving unit and converts the upper layer variable-length data into a series of packets to produce a packet stream and which produces a switching position indicating packet in response to the switching preparation signal and inserts the switching position indicating packet into packet streams to be sent through the active and the standby routes at insert positions coincident with each other to produce active and standby packet streams, and a plurality of cell assembling means of a redundant structure supplied with the active and the standby packet streams for Individually multiplexing the active and the standby packet streams to assemble active and standby ATM cells, respectively.

On the other hand, the receiving unit includes a plurality of cell disassembling means of a redundant structure for disassembling the active and the standby ATM cells to reproduce the active and the standby packet streams as reproduced active and reproduced standby packet streams, respectively, and packet disassembling means for detecting as a detected insert position the insert position of the switching position indicating packet in each of the reproduced active and the reproduced standby packet streams and reproducing the upper layer variable-length data from a part of the reproduced active packet stream before the detected insert position and a part of the reproduced standby packet stream after the detected insert position.

The "switching device" disclosed in Japanese Unexamined Patent Publication No. 2002-44090 intends to achieve uninterrupted AAL2 switching but never achieves active/standby switching without cell loss at an AAL2 cell level. The reason is as follows. In an existing active/standby switching method, information necessary to assembling/disassembling of an AAL2 cell (such information will be referred to as "handover information" in the present specification) is omitted upon carrying out active/standby switching so that the cell loss at the AAL2 cell level inevitably occurs after the active/standby switching.

For example, the AAL2 cell has a structure such that user data of a plurality of users are multiplexed in a single cell. As illustrated in FIG. 3, us r data of a single user may extend across two AAL2 cells In the situation where such cross-cell data are present, it is assumed that the handover Information (for example, a sequence number) for confirming the validity of the order of the AAL2 cells is not supplied from a formerly active system to a formerly standby system. In this event, the sequence number of each of the AAL2 cells is unknown so that the order of the AAL2 cells is not guaranteed. This results in a disadvantage that the AAL2 cell can not be assembled.

SUMMARY OF THE INVENTION

It is therefore an object of this invention to provide an active/standby switching system which includes an AAL2 cell assembling/disassembling processor having a dual structure to assure AAL2 cells upon active/standby switching.

According to one aspect of this invention, there is provided an active/standby switching system comprising two AAL2 (ATM Adaptation Layer Type 2) cell assembling/disassembling processor units as an active system and a standby system so that active/standby switching is carried out between the active system and the standby system, the active/standby switching being carried out by transferring, from one of the AAL2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the cours of disassembling, the AAL2 cell assembling/disassembling processor unit to become a new active system receiving the handover information and the uncompleted cell data and carrying out AAL2 cell assembling or disassembling.

The above-mentioned active/standby switching system may further comprise control means for controlling the AAL2 cell assembling/disassembling processor units as the active system and the standby system. Each of the AAL2 cell assembling/disassembling processor units comprises storing means for passing, discarding, or storing an ATM cell supplied from an input/output line section, ATM switching means which is for carrying out an ATM cell switching operation and which has the storing means, AAL2 processing means for disassembling the AAL2 cell passing through the storing means or for assembling Into the AAL2 cell, and switching control means responsive to a request from the control means for controlling the ATM switching means, th storing means, and the AAL2 processing means.

In response to the request from the control means, the switching control means in each of the AAL2 cell assembling/disassembling processor units as the active and the standby systems makes the storing means hold the ATM cell supplied from the input/output line section. The switching control means in the AAL2 cell assembling/disassembling processor units as the active and the standby systems carry out negotiation with each other to confirm that both of the AAL2 cell assembling/disassembling processor units as the active and the standby systems are in a switchable state. The switching control means in the AAL2 cell assembling/disassembling processor unit as the active system confirms whether or not the uncompleted cell data in the course of disassembling are left in the AAL2 processing means and the ATM switching means by checking the AAL2 processing means and the ATM switching means in this order. The switching control means in the AAL2 cell assembling/disassembling processor unit as the active system reads from the ATM switching means and the AAL2 processing means the handover information and, if the uncompleted cell data are left, the uncompleted cell data and transmits the handover information and the uncompleted cell data to the switching control means in the AAL2 cell assembling/disassembling processor unit as the standby system. The switching control means in the AAL2 cell assembling/disassembling processor unit as the standby system writes the handover information and the uncompleted cell data into the ATM switching means and the AAL2 processing means in the AAL2 cell assembling/disassembling processor unit as the standby system corresponding to those in the AAL2 cell assembling/disassembling processor unit as the active system from which the handover information and the uncompleted cell data have been read. After executing active/standby switching, the control means is responsive to a switching end notice from the switching control means in the AAL2 cell assembling/disassembling processor unit as a new active system requests the switching control means in the AAL2 cell assembling/disassembling processor units as the new active system and a new standby system to cancel cell holding. The AAL2 cell assembling/disassembling processor unit as the new active system makes the storing means cancel cell holding and sends the cell supplied from the input/output line section to the AAL processing means through the ATM switching means and the storing means to carry out assembling or disassembling of an AAL2 cell. The AAL2 cell assembling/disassembling processor unit as the new standby system makes the storing means cancel cell holding and mak s the storing means discard the cell supplied from th input/output line section.

The switching control means in the AAL2 cell assembling/disassembling processor unit as the active system acquires VC-related information defined for each VC (Virtual Call), comprising a sequence number, a short cell header, a short cell residual payload length, and a cross-header byte number across short cell headers, from the AAL2 processing means with respect to all VCs accommodated in the AAL2 cell assembling/disassembling processor unit. In addition, the switching control means in the AAL2 cell assembling/disassembling processor unit as the active system acquires ATM connection information from the ATM switching means and transfers the VC-related information and the ATM connection information as the handover information to the switching control means in the AAL2 cell assembling/disassembling processor unit as the standby system.

According to another aspect of this invention, there is provided an active/standby switching method of carrying out active/standby switching between two AAL2 (ATM Adaptation Layer Type 2) cell assembling/disassembling processor units as an active system and a standby system, the active/standby switching being carried out by transferring, from one of the AAL2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the course of disassembling, the AAL2 cell assembling/disassembling processor unit to become a new active system receiving the handover information and the uncompleted cell data and carrying out AAL2 cell assembling or disassembling.

The above-mentioned method comprises an ATM cell holding step of making an ATM cell supplied from an input/output line section be held in a storing section in both of the AAL2 cell assembling/disassembling processor units as the active and the standby systems, a first confirming step of confirming, through negotiation between the AAL2 cell assembling/disassembling processor units as the active and the standby systems, that both of the active and the standby systems are in a switchable state, a second confirming step of confirming, in the AAL2 cell assembling/disassembling processor unit as the active system, whether or not the uncompleted cell data in the course of disassembling are left in an AAL2 processing section for assembling or disassembling the AAL2 cell and an ATM switching section for carrying out an ATM cell switching operation and having the storing section by checking the AAL2 processing section and the ATM switching section in this order, a handover information reading step of reading, in the AAL2 cell assembling/disassembling processor unit as the active system, handover information and, if the uncompleted cell data are left, the uncompleted cell data and transmitting the handover Information and the uncompleted cell data to the AAL2 cell assembling/disassembling processor unit as the standby system, a handover information writing step of writing, in the AAL2 cell assembling/disassembling processor unit as the standby system, the handover information and the uncompleted cell data into the ATM switching section and the AAL2 processing section in the AAL2 cell assembling/disassembling processor unit as the standby system corresponding to those in the AAL2 cell assembling/disassembling processor unit as the active system from which the handover information and the uncompleted cell data have been read, and a cell holding canceling step of canceling, after executing active/standby switching, cell holding in response to a switching end notice from the AAL2 cell assembling/disassembling processor unit as a new active system. The AAL2 cell assembling/disassembling processor unit as the new active system makes the storing section cancel cell holding and sends the cell supplied from an input/output line section to th AAL processing section through the ATM switching section and the storing section to carry out assembling or disassembling of an AAL2 cell while the AAL2 cell assembling/disassembling processor unit as a new standby system makes the storing section cancel c ll holding and makes the storing section discard the cell supplied from the input/output line section.

In the above-mentioned method, the AAL2 cell assembling/disassembling processor unit as the active system acquires VC-related information defined for each VC (virtual Call), comprising a sequence number, a short cell header, a short cell residual payload length, and a cross-header byte number across short cell headers, from the AAL2 processing section with respect to all VCs accommodated in the AAL2 cell assembling/disassembling processor unit. In addition, the AAL2 cell assembling/disassembling processor unit as the active system acquires ATM connection information from the ATM switching section and transfers the VC-related information and the ATM connection information as the handover information to the AAL2 cell assembling/disassembling processor unit as the standby system.

DESCRIPTION OF THE PREFERRED EMBODIMENTS

Figure 1:
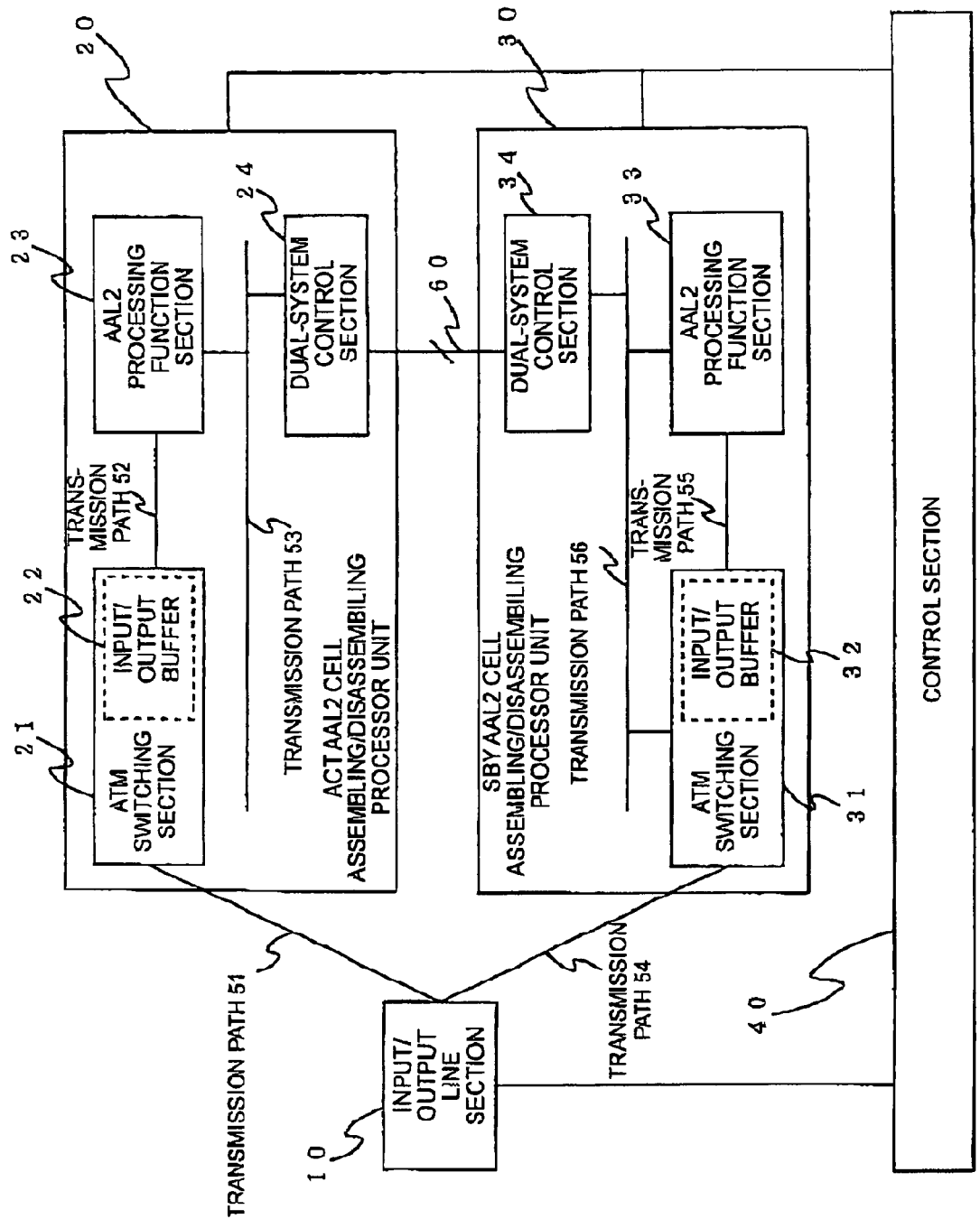
FIG. 1 is a block diagram of an active/standby switching system according to an embodiment of this invention.

Now, description will b mad of an active/standby switching system and an active/standby switching method according to an embodiment of this invention with reference to the drawing.

Referring to FIG. 1, an AAL2 cell assembling/disassembling processor 1 in an exchange includes an input/output line section 10 connected to a plurality of input lines, m in number, and connected to a plurality of ACT (Active) output lines, m in number, and a plurality of SBY (Standby) output lines, m in number, an ACT AAL2 cell assembling/disassembling processor unit 20 supplied with the m ACT output lines from the input/output line section 10, a SBY AAL2 cell assembling/disassembling processor unit 30 supplied with the m SBY output lines from the input/output line section 10, and a control section 40 for controlling the input/output line section 10, the ACT AAL2 cell assembling/disassembling processor unit 20, and the SBY AAL2 cell assembling/disassembling processor unit 30.

The ACT AAL2 cell assembling/disassembling processor unit 20 comprises an ACT ATM switching section 21 supplied with the m ACT output lines from the input/output line section 10, an input/output buffer 22 arranged inside the ACT ATM switching section 21, an AAL2 processing function section 23 supplied with a plurality of output lines, n in number, from the ACT ATM switching section 21, and a dual-system control section 24 bus-connected to the ACT ATM switching section 21 and the AAL2 processing function section 23.

The SBY AAL2 cell assembling/disassembling processor unit 30 comprises a SBY ATM switching section 31 supplied with the m SBY output lines from the input/output line section 10, an input/output buffer 32 arranged inside the SBY ATM switching section 31, an AAL2 processing function section 33 supplied with a plurality of output lines, n in number, from the SBY ATM switching section 31, and a dual-system control section 34 bus-connected to the SBY ATM switching section 31 and the AAL2 processing function section 33. The dual-system control sections 24 and 34 are bus-connected to the ATM switching sections 21 and 31 and the AAL2 processing function sections 23 and 33, respectively, and carry out dual-system control.

In FIG. 1, a single transmission path 51 connecting the input/output line section 10 and the ACT ATM switching section 21, a single transmission line 62 connecting the ACT ATM switching section 21 and the AAL2 processing function section 23, a single transmission path 54 connecting the input/output line section 10 and the SBY ATM switching section 31, and a single transmission path 55 connecting the SBY ATM switching section 31 and the AAL2 processing function section 33 are illustrated. It is to be noted that one of the m lines and one of the n lines are shown for simplicity of Illustration.

Each of the ATM switching sections 21 and 31 carries out an ATM c ll switching operation as In an ordinary ATM exchange.

Each of the input/output buffers 22 and 32 is a FIFO-type buffer and serves to pass or discard an input cell in a normal state and to store the input cell upon active/standby switching.

Each of the AAL2 processing function sections 23 and 33 serves to disassemble an AAL2 cell supplied from the input/output line section 10 into AAL2pf cells and to assemble the AAL2pf cells into the AAL2 cell.

Figure 2:
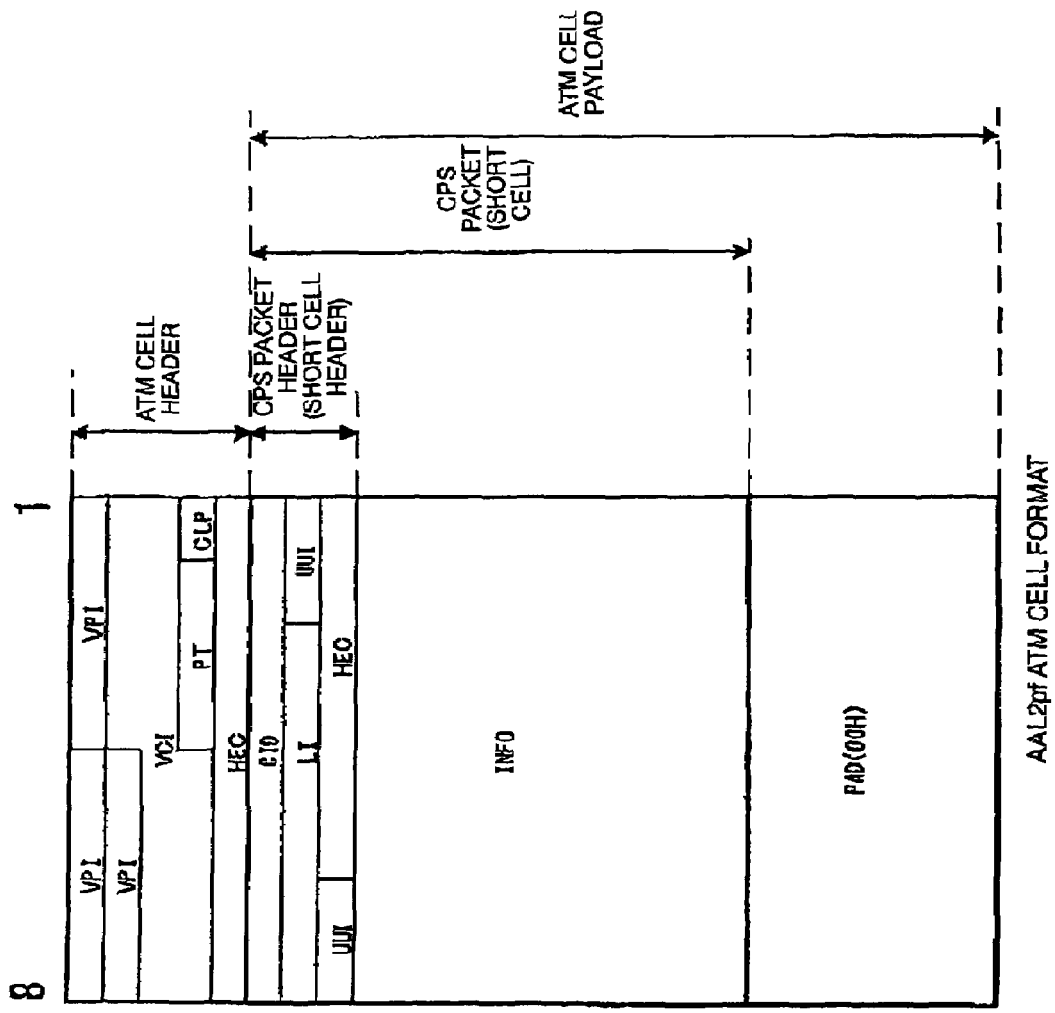
FIG. 2 shows a format of an AAL2pf cell.

Referring to FIGS. 2, description will be made of a format of the AAL2pf cell.

As illustrated in FIG. 2, the AAL2pf cell comprises an ATM cell header and an ATM cell payload. More in detail, the ATM cell header includes a VPI (Virtual Path Identifier) for use in identifying ATM connection, a VCI (Virtual Channel Identifier) also for use in identifying the ATM connection, a PT (Payload Type) for use in identifying a payload type, a CLP (Cell Loss Priority) for use in indicating the degree of priority in cell loss control which may be carried out upon occurrence of congestion or the like, and a HEC (Header Error Control) for use in detection and correction of a header error. The ATM cell payload includes a CID (Channel Identifier) indicative of channel identification, a LI (Length Indicator) indicative of a payload length, a UUI (User-to-User Indication) used in transmission of user-to-user information, a HEC for use in detection of a header error, an INFO (Information) as an information region, and a PAD (Padding). A region including the CID, the LI, the UUI, and the HEC is referred to as a CPS (Common Part Sublayer) packet header (or a short cell header). A region including the CPS packet header and the INFO is referred to as a CPS packet (short cell).

Figure 3:
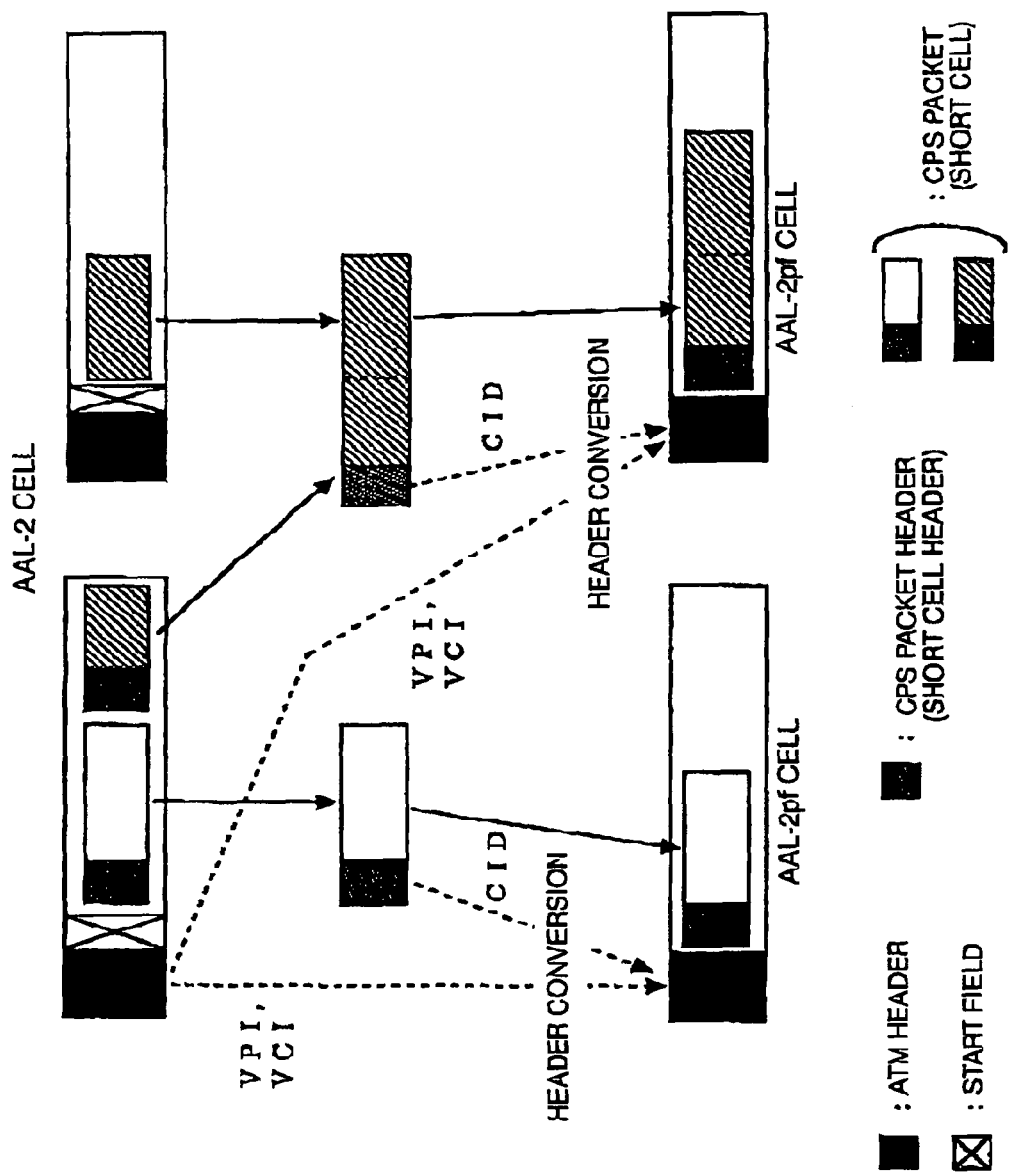
FIG. 3 is a view for describing a disassembling operation from AAL2 cells into AAL2pf cells.

Referring to FIG. 3, an operation of converting the AAL2 cell into the AAL2pf cell will be described. As illustrated in the figure, the CPS packet across two AAL2 cells is present. The AAL2 processing function sections 23 and 33 carry out header conversion from with reference to the ATM header and the CID to produce a new header. In addition, the CPS packet across the two cells is unified. From The CPS packet and the new header, an AAL2pf cell is produced.

In response to a request from the control section 40, the dual-system control sections 24 and 34 control the ATM switching sections 21 and 31, the input/output buffers 22 and 32, and the AAL2 processing function sections 23 and 33, respectively, to achieve active/standby switching.

Figure 5:
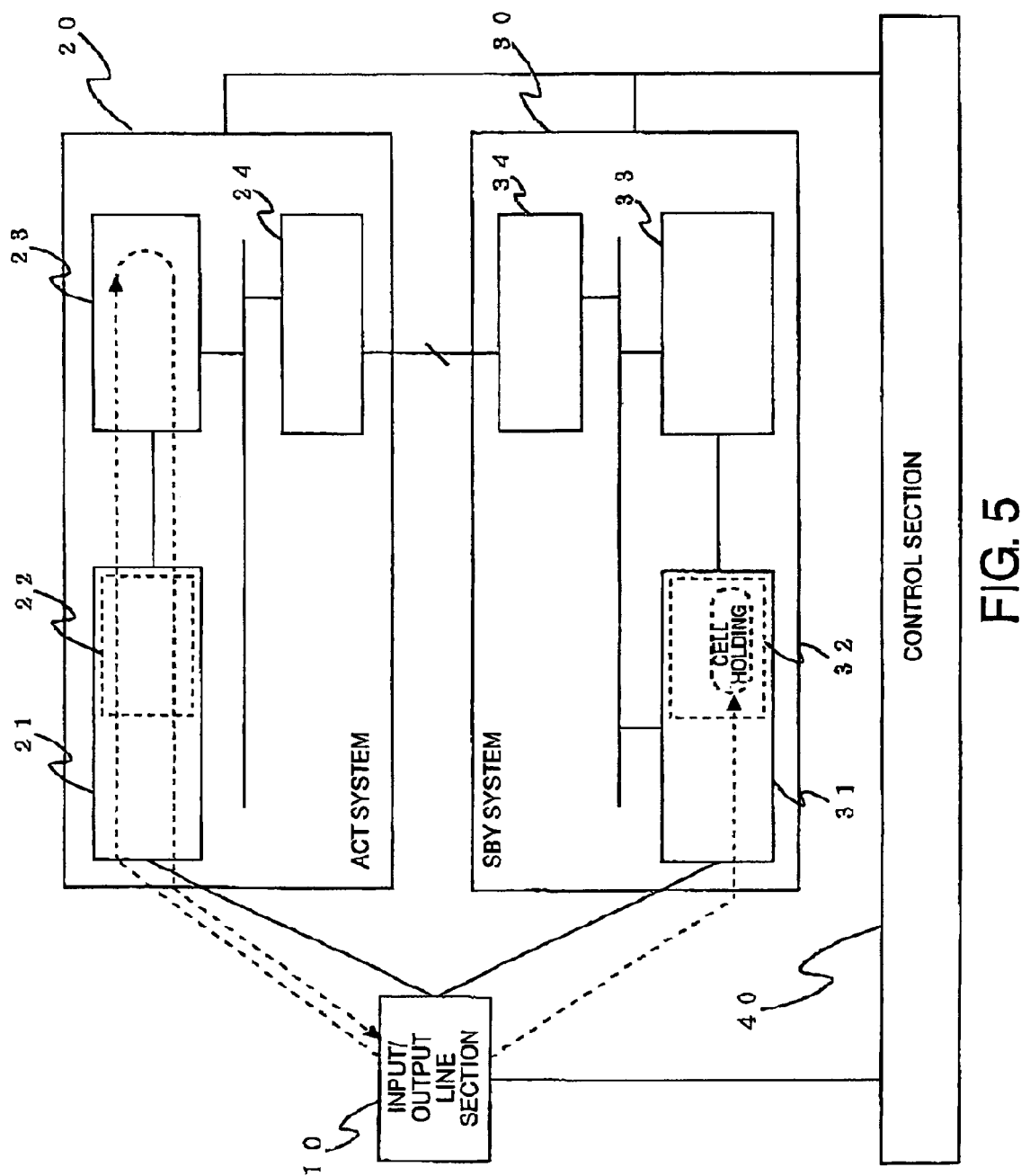
FIGS. 5 through 12 are views for describing a series of steps of an active/standby switching process.

In the active/standby switching system in this embodiment, a cell transmitted from the input/output line section 10 is supplied to each of the ACT ATM switching section 21 and the SBY ATM switching section 31 as depicted by broken lines in FIG. 5. In the ACT AAL2 cell assembling/disassembling processor unit 20 as an active system, the cell is supplied through the ACT ATM switching section 21 to the AAL2 processing function section 23 and is thereafter returned back through the ACT ATM switching section 21 to the input/output line section 10. In the SBY AAL2 cell assembling/disassembling processor unit 30 as a standby system, the cell supplied to the SBY ATM switching section 21 is discarded inside.

Next referring to FIGS. 4A through 12, description will be made of an operation of this embodiment.

At first referring to FIG. 5, it is assumed that, in an initial state, the AAL2 cell assembling/disassembling processor unit 20 comprising the ATM switching section 21, the input/output buffer 22, the AAL2 processing function section 23, and the dual-system control section 24 serves as an ACT (active) system while the AAL2 cell assembling/disassembling processor unit 30 serves as a SBY (standby) system.

As depicted by broken lines in FIG. 5, the ACT AAL2 cell assembling/disassembling processor unit 20 is connected to a route along which the input cell is sent from the input/output line section 10 through the ATM switching section 21 to the AAL2 processing function section 23 and another route along which the cell processed by the AAL2 processing function section 23 is returned back through the ATM switching section 21 to the input/output line section 10. Thus, the cell is transmitted and received between the input/output line section 10 and the ACT ATM switching section 21 and between the ACT ATM switching section 21 and the ACT AAL2 processing function section 23.

On the other hand, the SBY AAL2 cell assembling/disassembling processor unit 30 is connected to only one route between the input/output line section 10 and the ATM switching section 31. This is because, in the SBY system, the input cell is discarded in the input/output buffer 32 in the ATM switching section 31 and is not delivered to the AAL2 processing function section 33 at a succeeding stage.

Herein, a direction in which the cell is transmitted from the input/output line section 10 to the ACT ATM switching section 21 and further from the ACT ATM switching section 21 to the ACT AAL processing function section 23 will be referred to as a "downstream" direction. On the contrary, a direction in which the cell is transmitted from the ACT AAL2 processing function section 23 to the ACT ATM switching section 21 and further from the ACT ATM switching section 21 to the input/output line section 10 will be referred to as an "upstream" direction. This also applies to the SBY AAL2 cell assembling/disassembling processor unit 30.

Figure 4A:
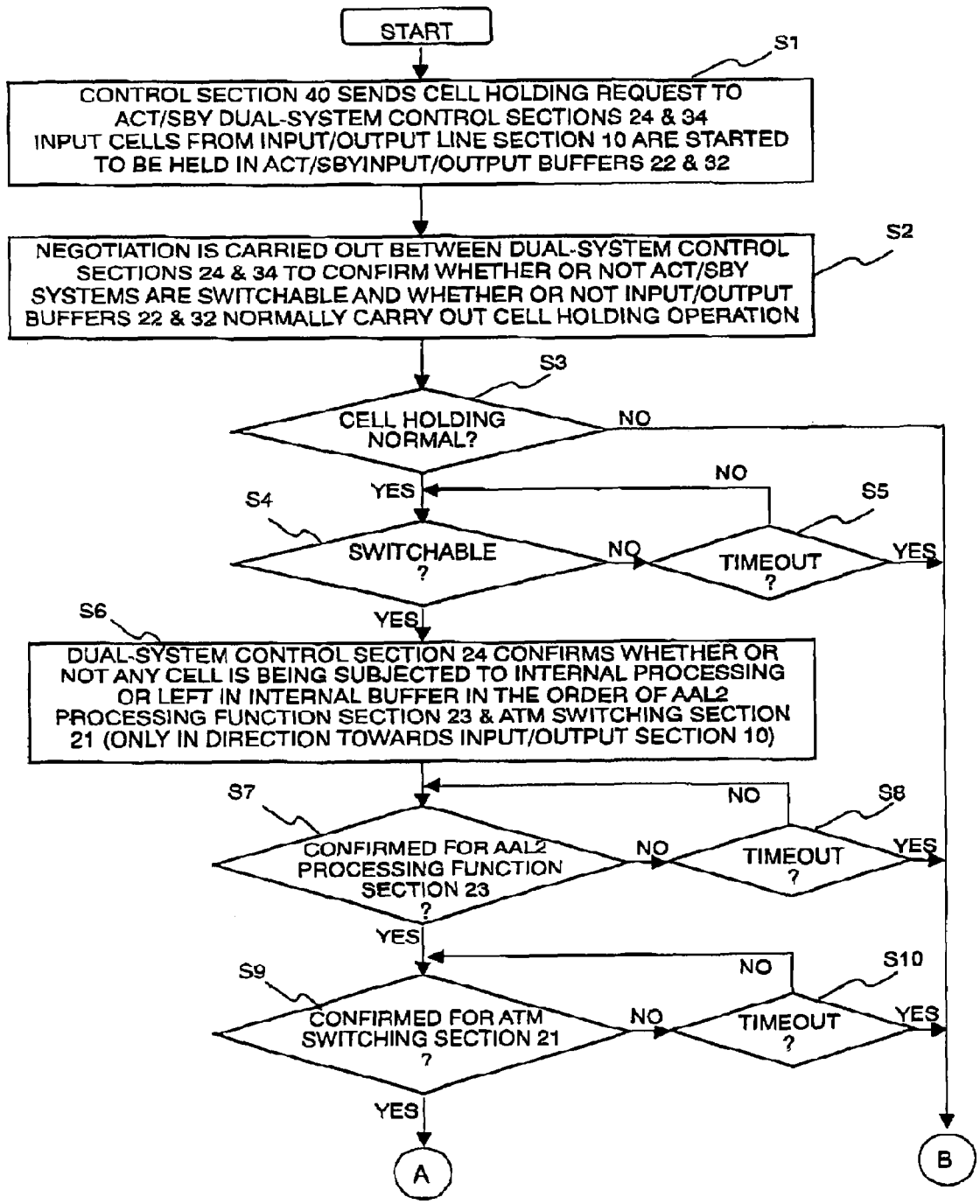
FIGS. 4A and 4B is a flow chart for describing an operation of the active/standby switching system illustrated in FIG. 1.
Figure 6:
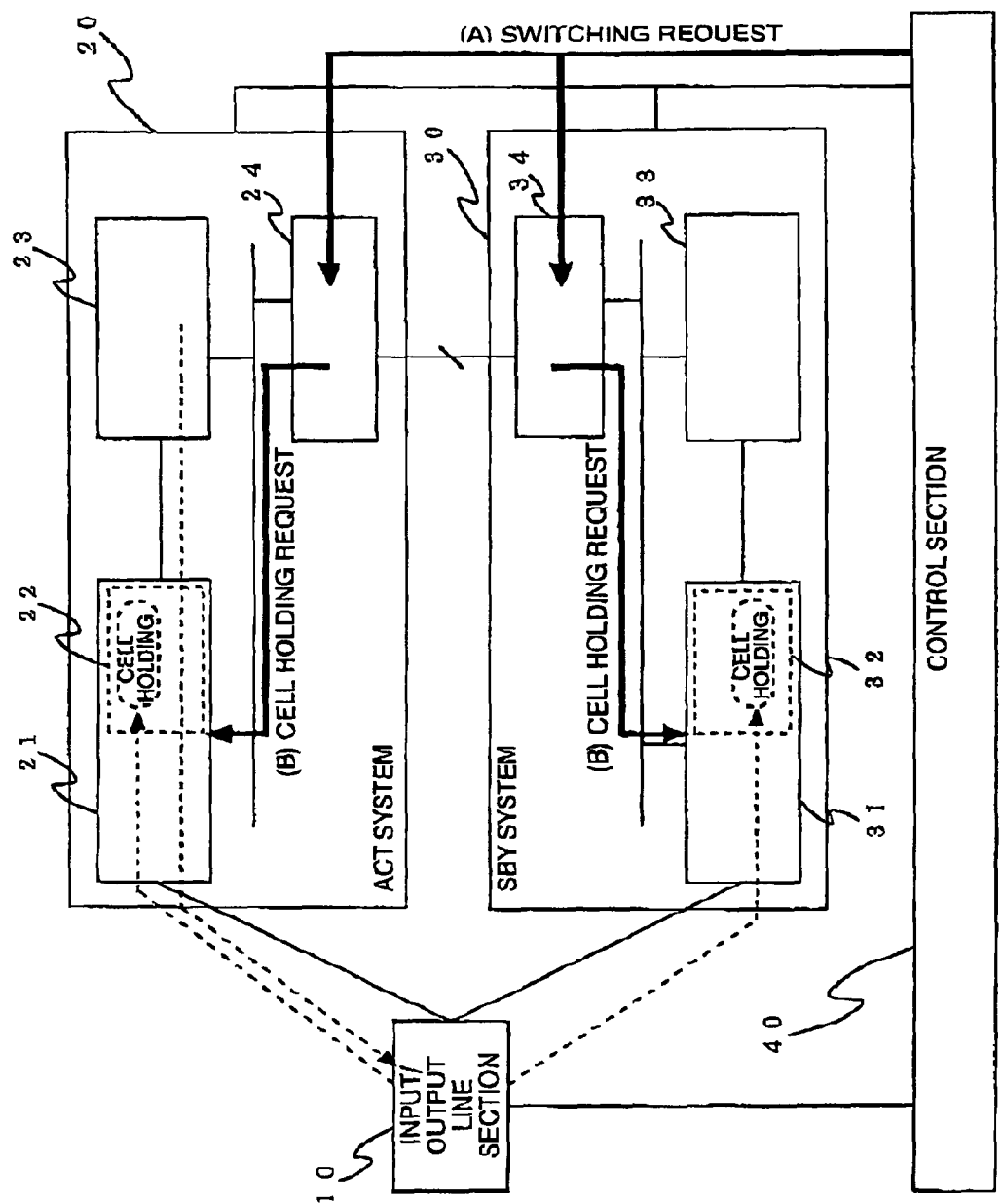

Referring to FIGS. 4A and 6, active/standby switching between the AAL2 cell assembling/disassembling processor units 20 and 30 is started as follows. At first, the control section 40 sends a switching request signal to the dual-system control sections 24 and 34 (step S1 in FIG. 4A) (see A in FIG. 6) In response to the switching request signal from the control section 40, the dual-system control sections 24 and 34 request the input/output buffers 22 and 32 in the ATM switching sections 21 and 31 to start a cell holding operation (step S1 in FIG. 4A) (see B in FIG. 6). Then, the input/output buffers 22 and 32 in both of the ACT and the SBY systems start to hold all ATM cells supplied from the input/output line section 10.

Figure 7:
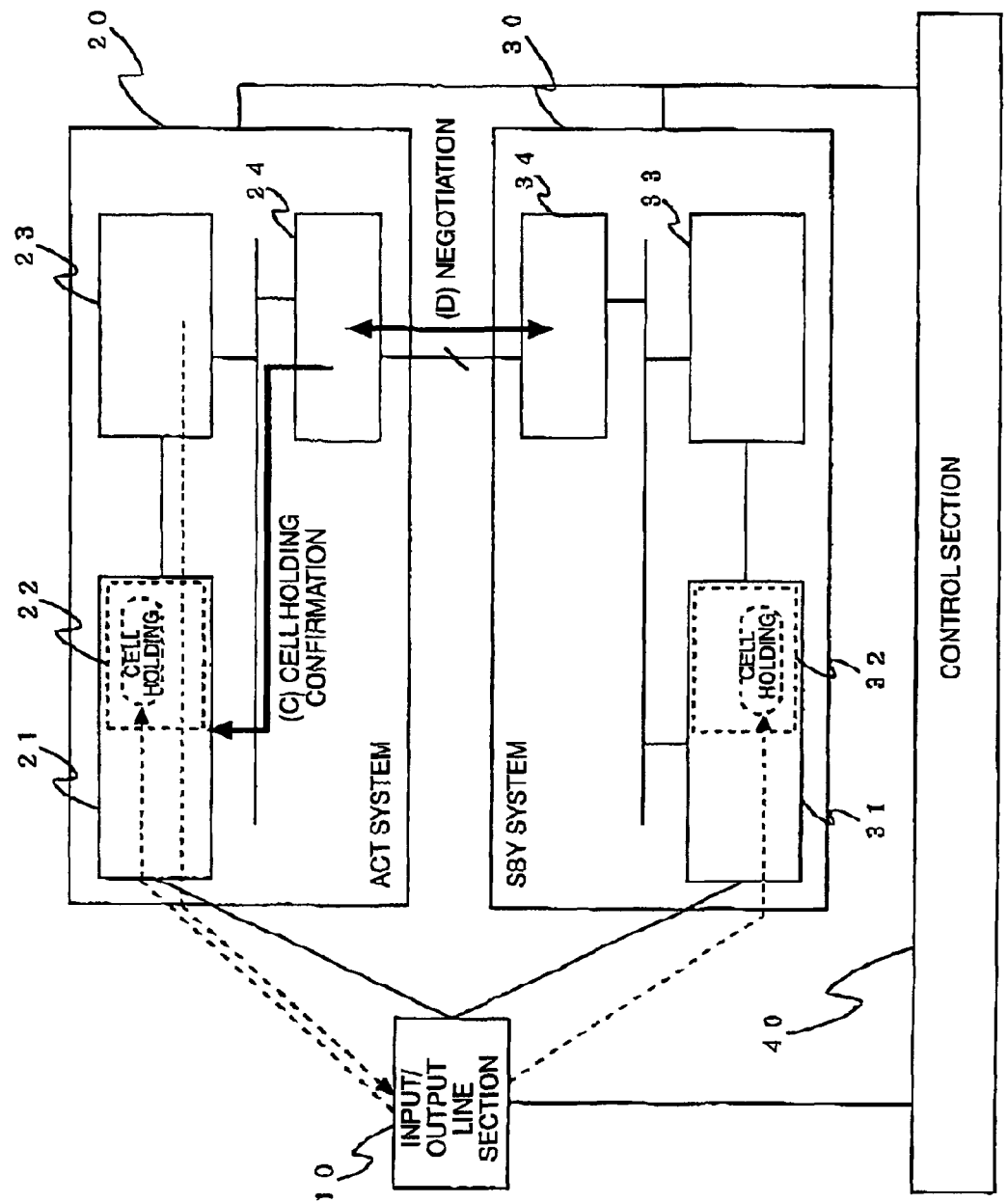

Next referring to FIGS. 4A and 7, the dual-system control section 24 in the ACT system confirms whether or not the input/output buffer 22 normally carries out the cell holding operation (step S2 in FIG. 4A) (see C in FIG. 7). If the cell holding operation is normally carried out (YES in step S3 in FIG. 4A), the dual-system control sections 24 and 34 confirms, through negotiation therebetween, whether or not both of the ACT and the SBY systems are in a switchable state (step S4 in FIG. 4A) (see D in FIG. 7). If both of the ACT and the SBY systems are in a switchable state (YES in step S4 in FIG. 4A), the operation proceeds to a next step (step S6 in FIG. 4A).

Figure 8:
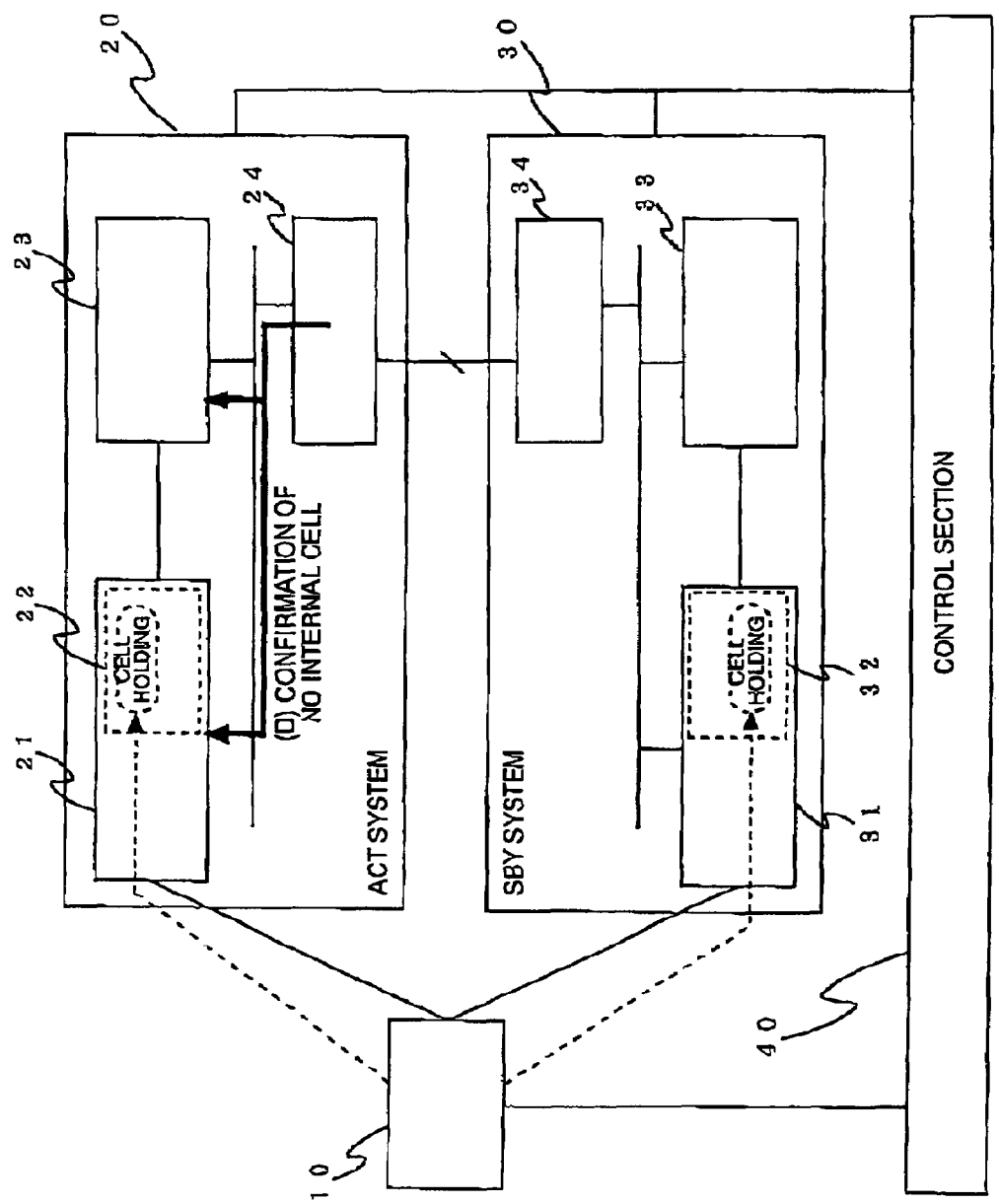

Referring to FIGS. 4A and 8, the dual-system control section 24 checks the AAL2 processing function section 23 and the ATM switching section 21 in this order to confirm whether or not any cell is being subjected to internal processing or stored in each of the AAL2 processing function section 23 and the ATM switching section 21 (step S6 in FIG. 4A) (see E in FIG. 8).

Those cells in the "downstream" direction from the input/output line section 10 to the ATM switching section 21 are already held in the input/output buffer 22 within the ATM switching section 21 and, therefore, do not flow into the AAL2 processing function section 23. Therefore, by transmitting all cells in the "upstream" direction from the AAL2 processing function section 23 through the ATM switching section 21 to the input/output line section 10, uncompleted cell data in the course of AAL2 disassembling are exclusively left in the AAL2 processing function section 23.

Figure 4B:
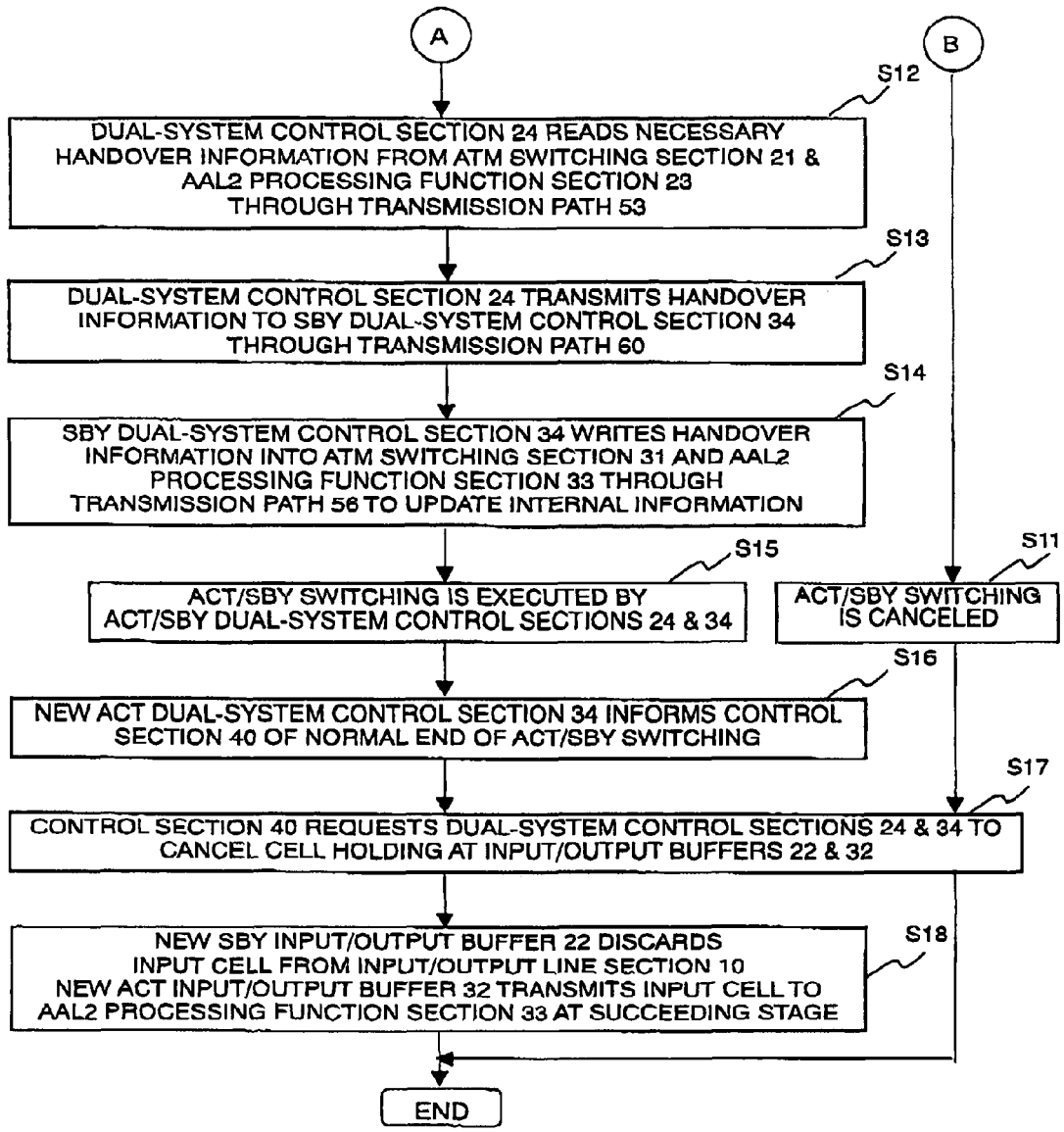
Figure 9:
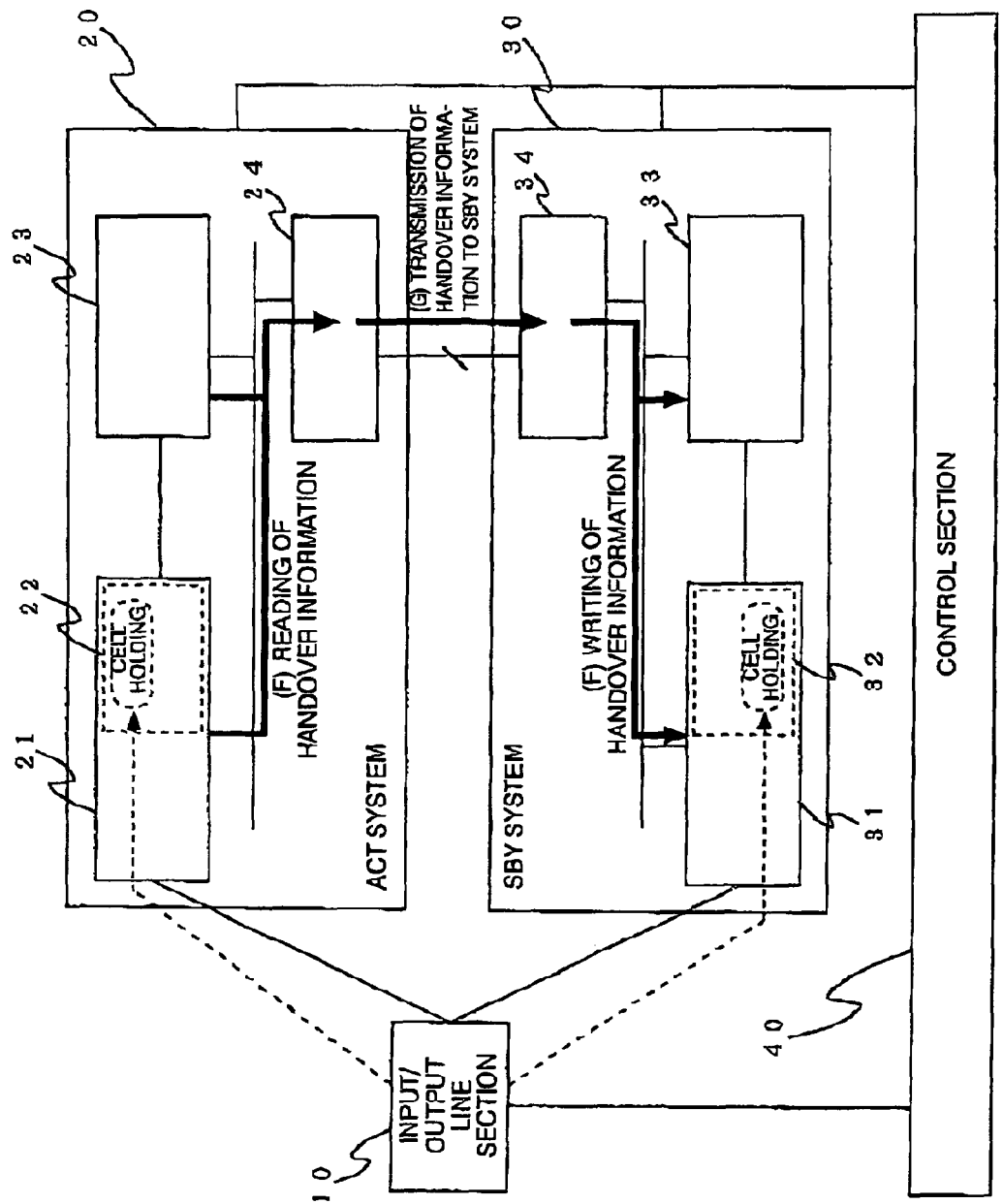

Next referring to FIGS. 4B and 9, the dual-system control section 24 reads necessary handover information from the ATM switching section 21 and the AAL2 processing function section 23 through the transmission path 53 (st p S12 in FIG. 4B) (see F in FIG. 9).

Upon active/standby switching between the AAL2 cell assembling/disassembling processor units, it is desired to execute the active/standby switching without occurrence of cell loss even at an AAL layer (without occurrence of cell loss at an AAL2 cell level). For this purpose, handover information (AAL2 cell parameter information) read from the ACT ATM switching section 21 and the AAL2 processing function section 23 and the uncompleted cell data in the course of AAL2 disassembling left in the AAL2 processing function section 23 at the step S6 must be copied from the ACT system to the SBY system to be held in the SBY system. If any part of the handover information is omitted, the uncompleted data in the course of AAL2 disassembling can not completely be disassembled. This results in occurrence of cell loss at the AAL2 cell level. The handov r information required in active/standby switching so as to assure the AAL2 cell is list d below. In case where the uncompleted cell data in the course of disassembling into the AAL2pf cell are left in the AAL2 processing function section 23 as confirmed in the step S6, the uncompleted cell data are supplied from the ACT system to the SBY system together with the handover information.

<Handover Information>
ATM connection information
Sequence number (SN)
Short cell header
Short cell residual payload length
Cross-header byte number across short cell headers The ATM connection information is held in the ATM switching section 21. The VC-related information including the sequence number (SN) required to AAL2 cell assembling/disassembling, the short cell header, the short cell residual payload length, and the cross-header byte number across short cell headers is defined for each VC (Virtual Call). Therefore, for all VCs accommodated in the AAL2 cell assembling/disassembling processor, the information must be acquired from the AAL processing function section 23.

Referring to FIGS. 4B and 9, after the handover information and the uncompleted cell data in the course of AAL2 disassembling are read, the dual-system control section 24 transmits the handover information and the uncompleted cell data through a transmission path 60 to the dual-system control section 34 in the SBY system (step S13 in FIG. 4B) (see G in FIG. 9).

Receiving the handover information and the uncompleted cell data, the dual-system control section 34 in the SBY system updates internal information by writing the handover information and the uncompleted cell data into the ATM switching section 31 and the AAL2 processing function section 33 in the SBY system corresponding to those in the ACT system from which the handover information and the uncompleted cell data have been read (step S14 in FIG. 4B) (see H in FIG. 9).

Figure 10:
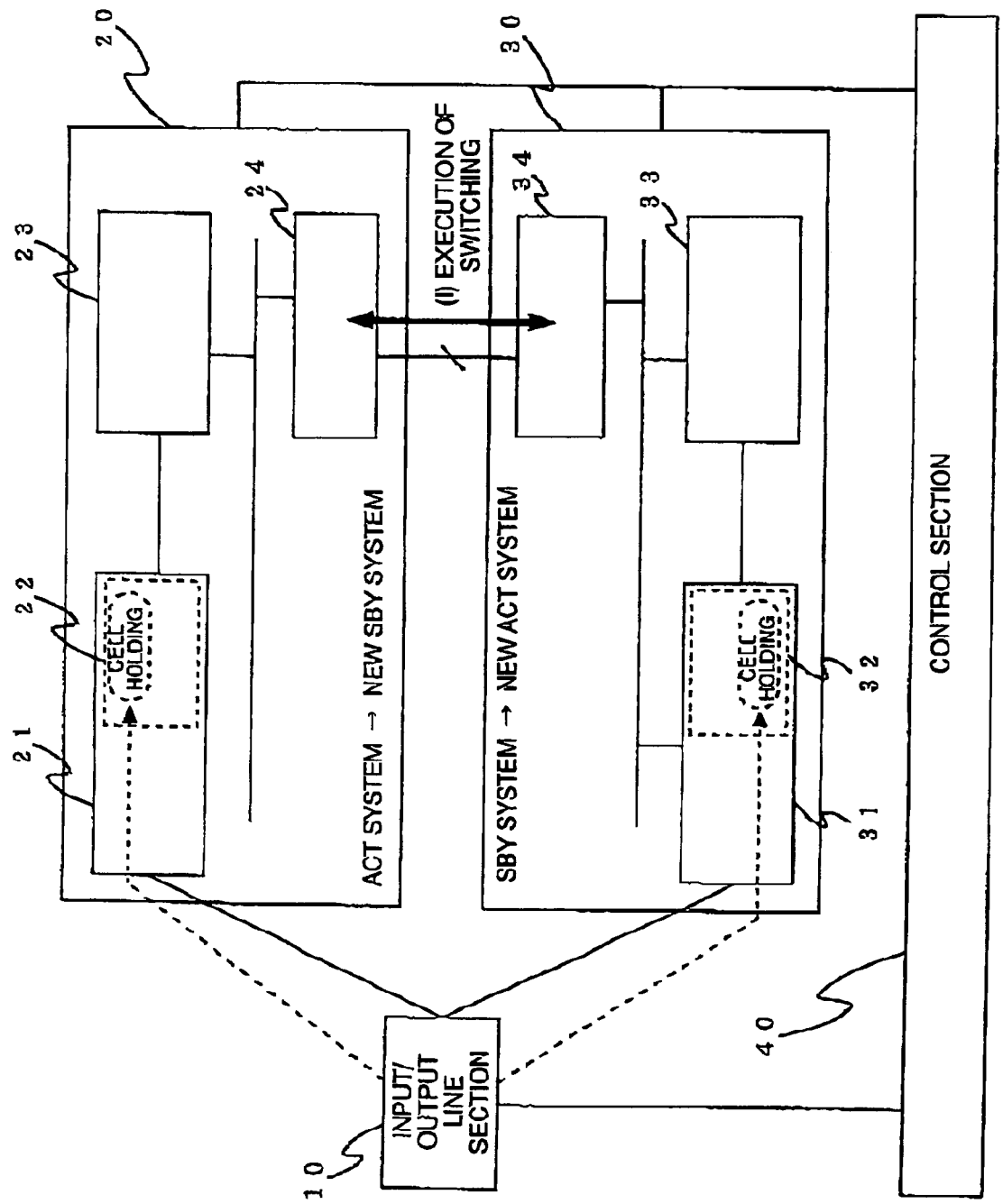

Referring to FIGS. 4B and 10, if the above-mentioned process normally ends, it is supposed that preparation has been completed in order to carry out active/standby switching without occurrence of cell loss at the AAL2 cell level. Therefore, the active/standby switching is executed by the dual-system control sections 24 and 34 in both of the ACT and the SBY systems (step S15 in FIG. 4B) (see I in FIG. 10).

Figure 11:
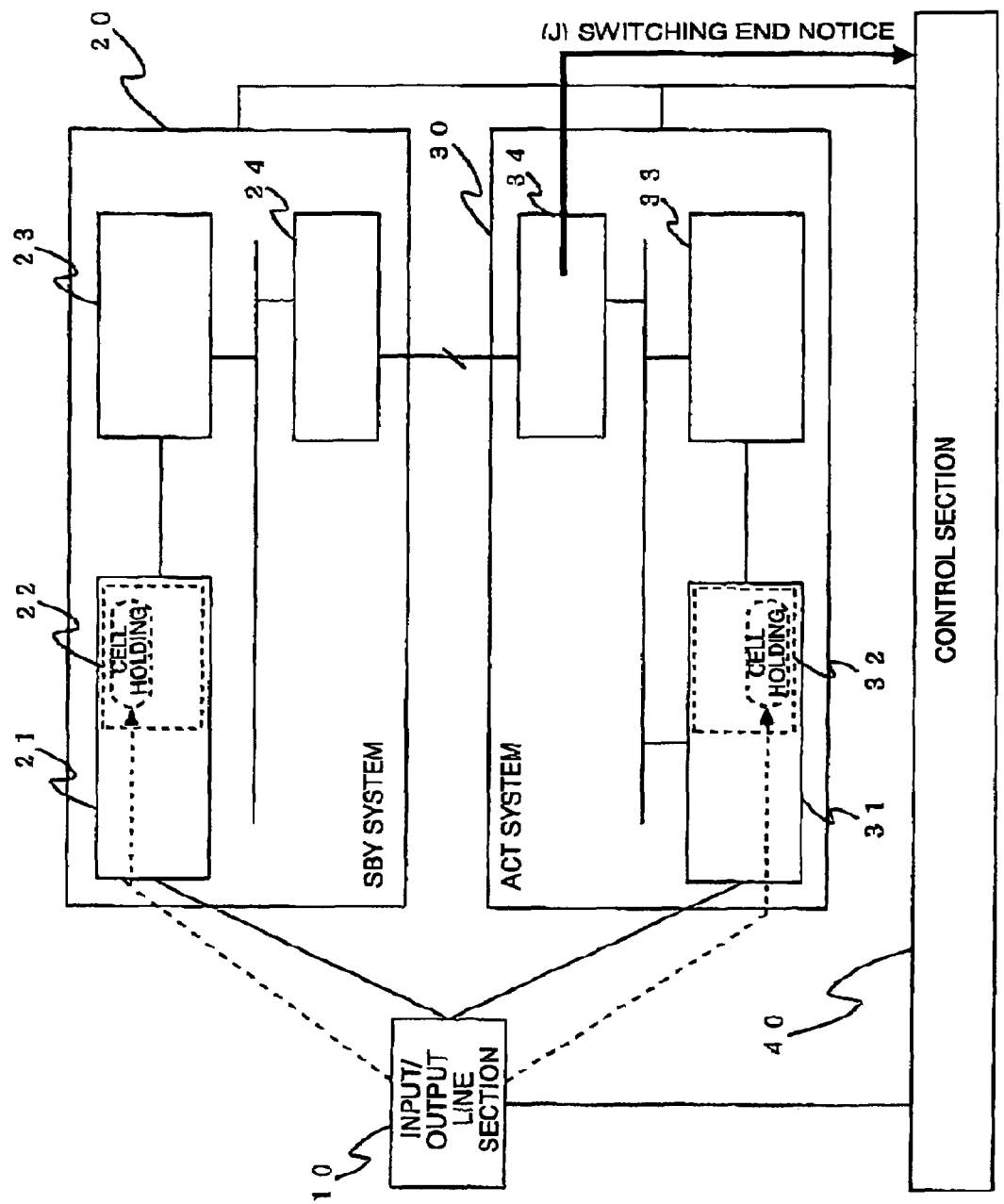

Referring to FIGS. 4B and 11, the dual-system control section 34 in a new ACT system supplies the control section 40 with a switching end notice indicating that the active/standby switching is normally ended (step S16 in FIG. 4B) (J in FIG. 11).

Figure 12:
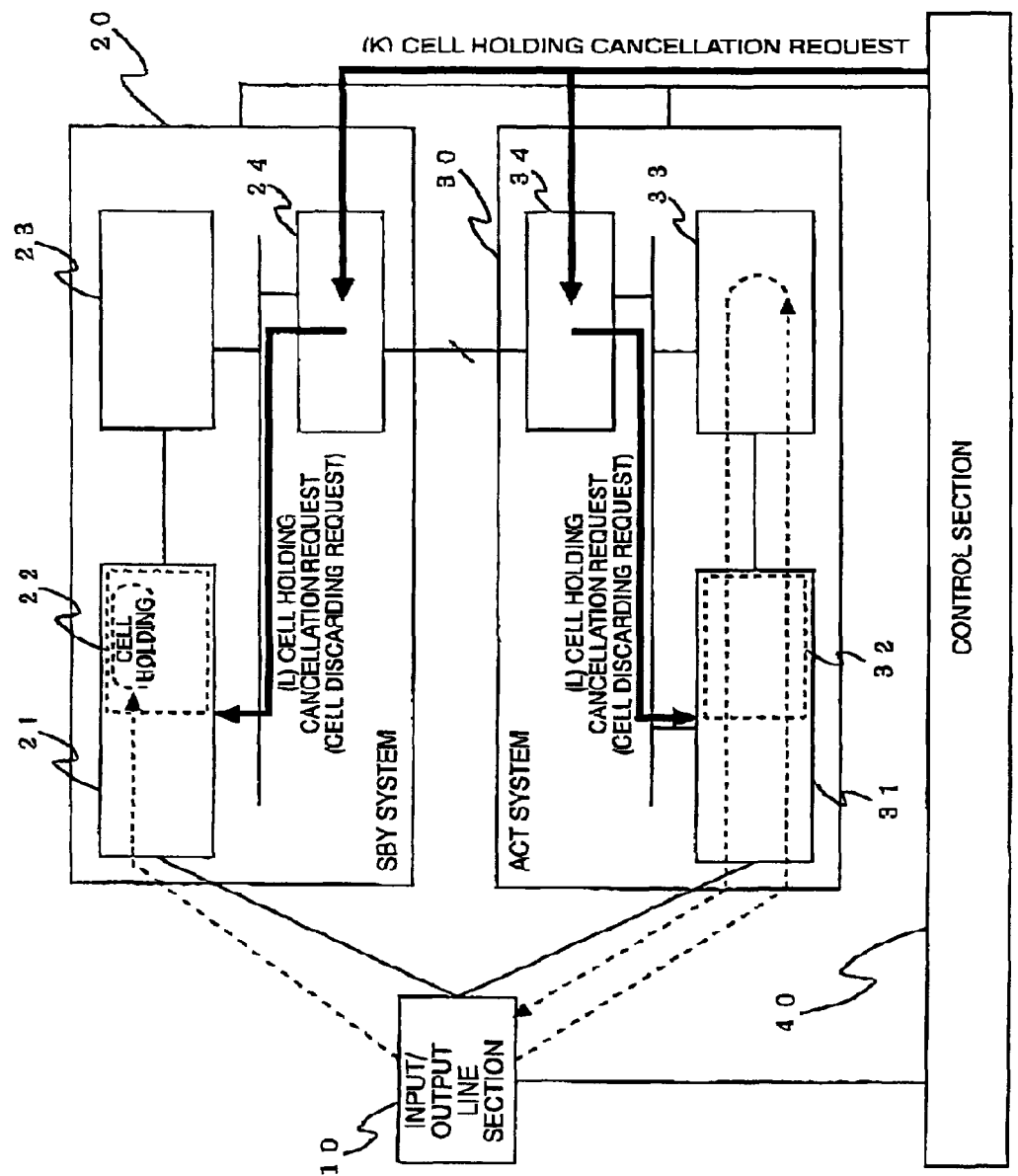

Referring to FIGS. 4B and 12, the control section 40 is responsive to the switching end notice from the dual-system control section 34 and sends a cell holding cancellation request to the dual-system control sections 24 and 34 (step S17 in FIG. 4B) (see K in FIG. 12). In response to the request, the dual-system control sections 24 and 34 request the input/output buffers 22 and 32 in the ATM switching sections 21 and 31 to cancel cell holding (see L in FIG. 12). In response to the request, the input/output buffer 22 in the AAL2 cell assembling/disassembling processor unit 20 as a new SBY system discards those cells supplied from the input/output line section 10 while the input/output buffer 32 in the AAL2 cell assembling/disassembling processor unit 30 as a new ACT system transmits the input cells to the AAL2 processing function section 33 at a succeeding stage (step S18 in FIG. 4B) (see broken lines in FIG. 12).

In the above-mentioned embodiment, upon active/standby switching, the handover information for preventing cell loss at the AAL2 c ll level from occurring as a result of active/standby switching and the uncompleted cell data in the course of disassembling are transferred from the AAL2 cell assembling/disassembling processor unit which has been the active system to the AAL2 cell assembling/disassembling processor unit which has been the standby system. In this manner, not only the cell loss at the ATM layer but also the cell loss at th AAL layer can be prevented. It is thus possible to achieve a dual-system AAL2 cell assembling/disassembling processor capable of carrying out active/standby switching without any cell loss for the AAL2 cells.

The above-mentioned embodiment is a preferred embodiment of this invention. It is noted here that this invention is not restricted thereto but may be modified in various manners within a scope of this invention. For example, in the above-mentioned embodiment, the switching request signal from the control section 40 is directly delivered to the dual-system control section. Alternatively, the switching request signal may be sent from the control section 40 through the input/output line section 10 to the ATM switching sections 21 and 31 where data switching is carried out between the user data and the switching request signal so that the user data are delivered to the AAL2 cell processing function section at a succeeding stage and the switching request signal is sent to the dual-system control section. In the above-mentioned embodiment, this invention is applied to an input/output buffer system. However, this invention is also applicable to a common cell buffer system.

As is obvious from the foregoing description, in this invention, upon active/standby switching, the handover information for preventing cell loss at the AAL2 cell level from occurring as a result of active/standby switching and the uncompleted cell data in the course of disassembling are transferred from the AAL2 cell assembling/disassembling processor unit which has been the active system to the AAL2 cell assembling/disassembling processor unit which has been the standby system. In this manner, not only th cell loss at the ATM layer but also the cell loss at the AAL layer can be prevented. It is thus possible to achieve a dual-system AAL2 cell assembling/disassembling processor capable of carrying out active/standby switching without cell loss for the AAL2 cells.

What is claimed is:

1. An active/standby switching system comprising two AAL2 (ATM Adaptation Layer Type 2) cell assembling/disassembling processor units (20, 30) as an active system and a standby system so that active/standby switching is carried out between the active system and said standby system;

the active/standby switching being carried out by transferring, from one of said AAL2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the course of disassembling, said AAL2 cell assembling/disassembling processor unit to become a new active system receiving the handover information and the uncompleted cell data and carrying out AAL2 cell assembling or disassembling;

wherein the handover information includes at least one of an ATM connection information, a sequence number (SN), a short cell header, a short cell residual payload length, and a cross-header byte number across short cell headers.

2. An active/standby switching system, comprising two AAL2 (ATM Adaptation Layer Type 2) cell assembling/disassembling processor units (20, 30) as an active system and a standby system so that active/standby switching is carried out between the active system and said standby system;

the active/standby switching being carried out by transferring, from one of said ML2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the course of disassembling, said AAL2 cell assembling/disassembling processor unit to become a new active system receiving the handover information and the uncompleted cell data and carrying out AAL2 cell assembling or disassembling;

and further comprising control means (40) for controlling said AAL2 cell assembling/disassembling processor units as the active system and the standby system;

each of said AAL2 cell assembling/disassembling processor units comprising:

storing means (22, 32) for passing, discarding, or storing an ATM cell supplied from an input/output line section (10);

ATM switching means (21, 31) which is for carrying out an ATM cell switching operation and which has said storing means;

AAL2 processing means (23, 33) for disassembling the AAL2 cell passing through said storing means or for assembling into the AAL2 cell; and switching control means (24, 34) responsive to a request from said control means for controlling said ATM switching means, said storing means, and said AAL2 processing means.

3. An active/standby switching system as claimed in claim 2, wherein:

said switching control means in each of said AAL2 cell assembling/disassembling processor units as the active and the standby systems is responsive to the request from said control means and makes said storing means hold the ATM cell supplied from said input/output line section;

said switching control means in said AAL2 cell assembling/disassembling processor units as the active and the standby systems carrying out negotiation with each other to confirm that both of said AAL2 cell assembling/disassembling processor units as the active and the standby systems are in a switchable state;

said switching control means in said AAL2 cell assembling/disassembling processor unit as the active system confirming whether or not the uncompleted cell data in the course of disassembling are left in said AAL2 processing means and said ATM switching means by checking said AAL2 processing means and said ATM switching means in this order;

said switching control means in said AAL2 cell assembling/disassembling processor unit as the active system reading from said ATM switching means and said AAL2 processing means the handover information and, if the uncompleted cell data are left, the uncompleted cell data and transmitting the handover information and the uncompleted cell data to said switching control means in said AAL2 cell assembling/disassembling processor unit as the standby system;

said switching control means in said AAL2 cell assembling/disassembling processor unit as the standby system writing the handover information and the uncompleted cell data into said ATM switching means and said AAL2 processing means in said AAL2 cell assembling/disassembling processor unit as the standby system corresponding to those in said AAL2 cell assembling/disassembling processor unit as the active system from which the handover information and the uncompleted cell data have been read;

said control means requesting, in response to a switching end notice from said switching control means in said AAL2 cell assembling/disassembling processor unit as a new active system after executing active/standby switching, said switching control means in said AAL2 cell assembling/disassembling processor units as the new active system and a new standby system to cancel cell holding;

said AAL2 cell assembling/disassembling processor unit as the new active system making said storing means cancel cell holding and sending the cell supplied from said input/output line section to said AAL processing means through said ATM switching means and said storing means to carry out assembling or disassembling of an AAL2 cell; and said AAL2 cell assembling/disassembling processor unit as the new standby system making said storing means cancel cell holding and making said storing means discard the cell supplied from said input/output line section.

4. An active/standby switching system as claimed in claim 2, wherein:

said switching control means in said AAL2 cell assembling/disassembling processor unit as the active system acquires VC-related information defined for each VC (Virtual Call), comprising a sequence number, a short cell header, a short cell residual payload length, and a cross-header byte number across short cell headers, from said AAL2 processing means with respect to all VCs accommodated in said AAL2 cell assembling/disassembling processor unit, acquires ATM connection information from said ATM switching means, and transfers the VC-related information and the ATM connection information as the handover information to said switching control means in said AAL2 cell assembling/disassembling processor unit as the standby system.

5. An active/standby switching method of carrying out active/standby switching between two AAL2 (ATM Adaptation Layer Type 2) cell assembling/disassembling processor units as an active system and a standby system;

the active/standby switching being carried out by transferring, from one of said AAL2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the course of disassembling, said AAL2 cell assembling/disassembling processor unit to become a new active system receiving the handover information and the uncompleted cell data and carrying out AAL2 cell assembling or disassembling;

wherein the handover information includes at least one of an ATM connection information, a sequence number (SN), a short cell header, a short cell residual payload length, and a cross-header byte number across short cell headers.

6. An active/standby switching method of carrying out active/standby switching between two AAL2 (ATM Adaptation Layer Type 2) cell assembling/disassembling processor units as an active system and a standby system;

the active/standby switching being carried out by transferring, from one of said AAL2 cell assembling/disassembling processor units which has been the active system to the other AAL2 cell assembling/disassembling processor unit which has been the standby system, handover information to prevent cell loss of AAL2 cells from occurring as a result of the active/standby switching and uncompleted cell data in the course of disassembling, said AAL2 cell assembling/disassembling processor unit to become a new active system receiving the handover information and the uncompleted cell data and carrying out AAL2 cell assembling or disassembling;

the method comprising the steps of:

an ATM cell holding step of making an ATM cell supplied from an input/output line section be held in a storing section in both of said AAL2 cell assembling/disassembling processor units as the active and the standby systems;

a first confirming step of confirming, through negotiation between said AAL2 cell assembling/disassembling processor units as the active and the standby systems, that both of the active and the standby systems are in a switchable state;

a second confirming step of confirming, in said AAL2 cell assembling/disassembling processor unit as the active system, whether or not the uncompleted cell data in the course of disassembling are left in an AAL2 processing section for assembling or disassembling the AAL2 cell and an ATM switching section for carrying out an ATM cell switching operation and having said storing section by checking said AAL2 processing section and said ATM switching section in this order;

a handover information reading step of reading, in said AAL2 cell assembling/disassembling processor unit as the active system, handover information and, if the uncompleted cell data are left, the uncompleted cell data and transmitting the handover information and the uncompleted cell data to said AAL2 cell assembling/disassembling processor unit as the standby system;

a handover information writing step of writing, in said AAL2 cell assembling/disassembling processor unit as the standby system, the handover information and the uncompleted cell data into said ATM switching section and said AAL2 processing section in said AAL2 cell assembling/disassembling processor unit as the standby system corresponding to those in said AAL2 cell assembling/disassembling processor unit as the active system from which the handover information and the uncompleted cell data have been read; and a cell holding canceling step of canceling, after executing active/standby switching, cell holding in response to a switching end notice from said AAL2 cell assembling/disassembling processor unit as a new active system;

said AAL2 cell assembling/disassembling processor unit as the new active system making said storing section cancel cell holding and sending the cell supplied from an input/output line section to said AAL processing section through said ATM switching section and said storing section to carry out assembling or disassembling of an AAL2 cell;

said AAL2 cell assembling/disassembling processor unit as a new standby system making said storing section cancel cell holding and making said storing section discard the cell supplied from said input/output line section.

7. An active/standby switching method as claimed in claim 6, wherein:

said AAL2 cell assembling/disassembling processor unit as the active system acquires VC-related information defined for each VC (Virtual Call), comprising a sequence number, a short cell header, a short cell residual payload length, and a cross-header byte number across short cell headers, from said AAL2 processing section with respect to all VCs accommodated in said AAL2 cell assembling/disassembling processor unit, acquires ATM connection information from said ATM switching section, and transfers the VC-related information and the ATM connection information as the handover information to said AAL2 cell assembling/disassembling processor unit as the standby system.

* * * * *